March 1, 1960 K. J. CHICHESTER ET AL 2,927,172
SPEED GOVERNOR FOR MOTORS OR THE LIKE
Filed Jan. 8, 1959
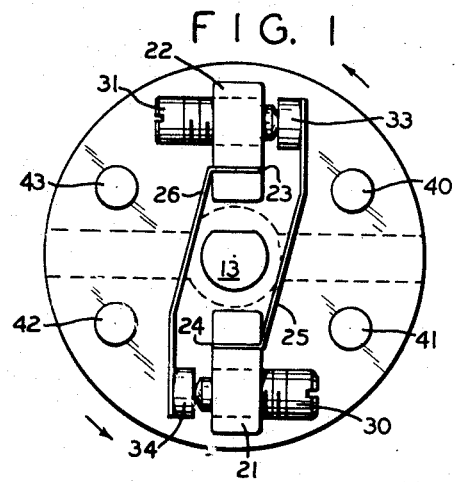
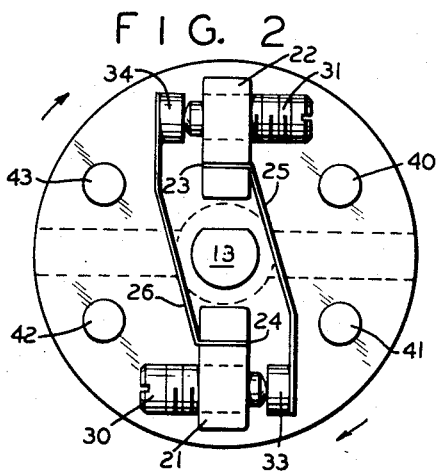
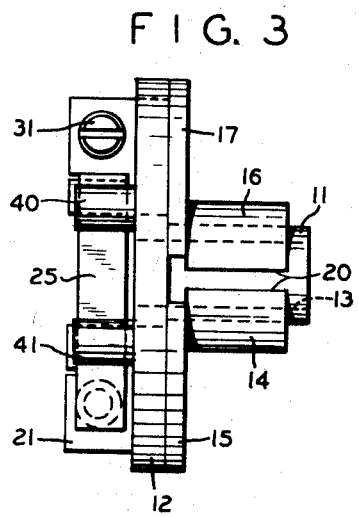
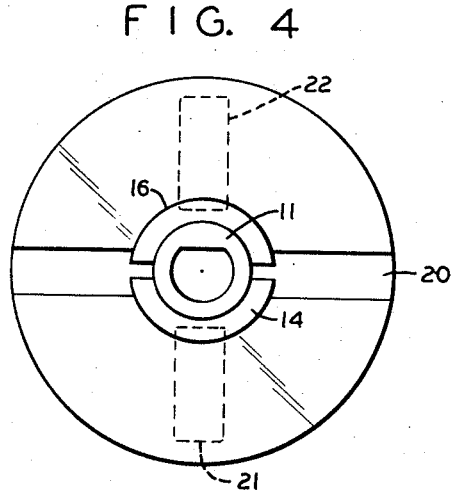
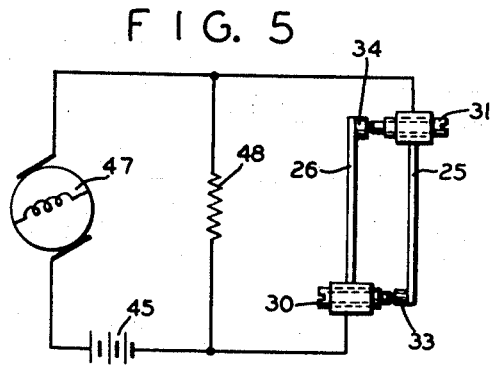
*INVENTORS.*
KENNETH J. CHICHESTER
EDWARD M. CROCCO
BY
Ervin B. Steinberg
AGENT.

2,927,172
Patented Mar. 1, 1960

2,927,172
SPEED GOVERNOR FOR MOTORS OR THE LIKE

Kenneth J. Chichester, Stamford, and Edward M. Crocco, Greenwich, Conn., assignors to The Reflectone Corporation, Stamford, Conn., a corporation of Connecticut Application January 8, 1959, Serial No. 785,593

3 Claims. (Cl. 200—80)

This invention relates to a rotational speed governor and more particularly has reference to a speed governor for very small motors, for instance permanent magnet motors as used in battery operated office machines, portable dictating machines, battery operated missile control systems and in many other and similar applications.

This invention furthermore refers to improvements in a governor design as disclosed in copending application for U.S. Letters Patent entitled "Governor for Small Motors," Serial No. 748,836, filed July 16, 1958, now U.S. Patent No. 2,886,666 issued May 12, 1959.

Rotational speed governors of the type indicated above must satisfy many requirements which are more or less unique. For instance, these small direct current motors operate at speeds of many thousand R.P.M., so that the governors are required to be dynamically balanced and to withstand high speed operation. In view of the small size of these motors, the governor must be compact, occupy a minimum amount of space, yet be completely reliable. Moreover, a governor in this type of application is required to operate without maintenance, must comprise a minimum number of individual parts, yet be inexpensive to manufacture. Last but not least, the efficiency of the motor to a great extent depends upon the losses within the governor construction. Since most of the motors indicated above are battery-operated, the efficiency, or current drain, assumes major importance. The governor therefore, should be designed for a minimum amount of loss, particularly friction loss as caused by the brush contact which establishes connection to the rotating governor assembly. Since the brush pressure is dictated by electrical considerations, a major improvement can be made by designing the governor in such a manner that the brushes engage the governor construction as near to the center of rotation as possible. In this way, the torque loss (contact pressure times radial distance) may be kept to a minimum.

The design disclosed in the aforementioned copending application for U.S. Letters Patent meets substantially all the requirements enumerated. However, careful investigations and measurements carried out with the design disclosed as well as carried out with most prior art devices show that the governors are rotation sensitive, that is, the accuracy of speed regulation is dependent upon the rotation of the motor. For example, typical values are one percent accuracy of speed regulation in one direction and four to six percent regulation accuracy in the opposite direction. It will be obvious that the one percent value suffices in most applications while the four to six percent oftens exceeds acceptable tolerance limits.

A careful examination of this problem has shown that the change in the accuracy of speed regulation is caused by the disposition of the interrupting contact on the governor assembly. When the interrupting contact, particularly the free-moving contact leaf, is positioned at the trailing edge, the force effective on this contact as caused by acceleration of the governor assembly is such as to promote very accurate speed regulation, whereas when the flexible contact is positioned at the leading edge, the same force impedes precise speed regulation.

One of the objects of this invention therefore is the provision of a new and improved governor design which avoids one or more of the disadvantages and limitations of prior art devices.

Another object of this invention is the provision of a governor design which provides highly precise speed regulation for either direction of rotation.

Another object of this invention is the provision of a rotational speed governor which may be assembled for either clockwise or counterclockwise rotation and when assembled properly, will provide very precise speed regulation.

Another object of this invention is the provision of a governor design which is characterized by a minimum number of parts.

Another object of this invention is the provision of a governor for small D.-C. motors which employs a quantity of identical parts.

Another object of this invention is the provision of a governor for small D.C. motors which employ a pair of interrupting contacts in order to improve reliability and lengthen its useful life.

A further object of this invention is a governor design which is compact in its configuration and therefore requires a minimum amount of space.

Further and other objects will become apparent by reference to the following specification taken in conjunction with the accompanying drawings in which:

Figure 1 is a plan view of the governor design showing the contact arrangement assembled for counter-clockwise rotation;

Figure 2 is a plan view of the instant governor design showing the contact arrangement assembled for clockwise rotation;

Figure 3 is a side elevational view of the governor when assembled per Figure 2;

Figure 4 is a plan view at the underside of the governor, and

Figure 5 is a schematic circuit diagram showing the electrical connections of the governor in conjunction with the motor to which the governor is attached.

Referring now to Figures 1 through 4, numeral 11 identifies an annular bushing which together with plate 12 forms a unitary flange made of insulating material, for instance nylon, or of other suitable plastic composition. This flange construction generally is mounted on a rotatable shaft of a motor by means of aperture 13 which extends through the flange.

Onto this flange, made of insulating material, there is mounted a split flange made of metallic material, for instance brass, which includes a first flange half comprising a half bushing 14 and plate 15, and a second flange half comprising half bushing 16 and plate 17. Both metallic flange halves are separated by a diagonal slot 20 in order to effect electrical isolation between the two parts. It will be understood however, that both metal portions and the portions made of plastic material form a unitary moulding whereby plates 15 and 17 constitute a disk made of two half sections insulated one from another.

Projecting from metal plate 15 and through insulating plate 12 there is an upstanding metal block 21 which forms a part of plate 15. Similarly, upstanding block 22 forms a part of metal plate 17 and also projects through plate 12. Both blocks are substantially rectangular in shape and are mounted in identical and symmetrical relationship onto their respective halves so that a diagonal line through the disk is substantially coincident with the major axis through each of these blocks. Each of the blocks is equipped with a transverse slot 23 and 24 respectively in which there is retained an elongated leaf type contact spring 25 and 26 respectively. This type of mounting is commonly known as "cantilever" type. The leaf contact springs are resilient, made for instance of beryllium-copper alloy or of "Ni-Span" made by the H. A. Wilson Company of Union, New Jersey. This latter metal has the desirable characteristics that its modulus of elasticity is substantially constant for the normal operating temperature range from minus 50 to plus 150 degrees F. thereby obtaining stability of operation over a wide temperature range. Each contact spring is secured in its respective slot by staking.

A screw 30 and 31 respectively protruding through each of the blocks is adapted to engage the free end of one of the contact leaf springs extending thereto from the opposite block, the free end of each spring being equipped with suitable contact material 33 and 34 respectively. The contact material, for example a platinum-iridium alloy, may be incorporated also in the contact tips of the adjustable screw means 30 and 31 respectively.

When the entire assembly is mounted on a motor shaft, leaf springs 25 and 26, by action of centrifugal force, are urged to pivot outwardly so as to break contact with the associated rigid screw contact. Outward motion of the springs is limited by upstanding bosses 40, 41, 42 or 43 respectively which form an integral part with plate 12 and are made of insulating material. It will be apparent that in Figure 1 bosses 40 and 42 are effective for limiting outward motion while in Figure 2 bosses 41 and 43 will be engaged by the respective leaf springs.

Upon careful examination it will be apparent that the construction of both governor halves is completely identical and that the leaf springs 25 and 26 are also identical so that the assembly may be arranged either as depicted in Figure 1 or as shown in Figure 2 without requiring different or additional parts. In this manner, the governor may be assembled for counter-clockwise rotation as shown in Figure 1 or for clockwise rotation as illustrated in Figure 2. The reason for this preferred assembly will be apparent from the following discussion:

Assuming that the governor is rotating in counter-clockwise direction, Figure 1, and that the centrifugal force effective on leaf springs 25 and 26 is such that leaf contact 33 is just about ready to engage fixed contact 31 and leaf contact 34 is just about ready to engage fixed contact 30. As soon as the respective contacts engage one another, the circuit from the source of energy to the motor winding is closed thereby supplying electrical energy to the motor winding and causing the motor to attain a sudden power surge which results in a sudden increase in rotational speed. This acceleration produces an almost instantaneous separation between contacts 33 and 31 and 30 and 34 respectively by virtue of the inertia of leaf springs 25 and 26 which cannot without a certain amount of time delay—although minute—follow the rotational speed of the rigid contacts. In this manner, during acceleration of the governor, the inertia of the leaf springs is utilized to cause quick opening of the contacts. Similarly, once the contacts are broken, the governor decelerates and the inertia of the leaf springs causes a quick closing of the respective contacts. The speed undulations therefore are kept within close limits.

It will be apparent that the same condition applies to the assembly in Figure 2 wherein the rotation is in clockwise direction. Again the contacts are assembled in such a manner that acceleration in clockwise direction aids in the opening of the electrical circuit between the rigid screw contacts and the free ends of the leaf springs. In the event that the rotation would be in the reverse direction, the inertia effect would be such as to retain the free ends of the leaf springs in engagement with the respective rigid screw type contacts until the motor speed has attained such an increase that the centrifugal force is large enough to overcome the inertia of the spring contacts and cause separation between the respective governor contacts. It will be apparent that this latter condition requires a much larger amount of speed increase and accounts therefore for greater speed undulations. The use of the governor in conjunction with a D.-C. motor is shown in Figure 5. Electrical circuit connection to the governor construction is accomplished by means of a set of diametrically opposed, stationary contact brushes, one brush engaging half bushing 14 and the other brush engaging bushing 16. As explained previously, bushing 14 is in electrical contact with block 21 and bushing 16 in contact with block 22. A source of direct current 45 is connected to motor 46 and its rotor winding 47. When contact screw 31 engages contact leaf spring 26, or when screw contact 30 engages contact 33 of leaf spring 25, the circuit is closed and the motor receives power. As soon as preadjusted speed is reached, centrifugal force will urge springs 25 and 26 away from engagement with the respective contact screw, thus interrupting the circuit from the power source, causing the motor to slow down, until contact is re-established. This cycle of events is repeated over and over again. As explained heretofore, the governor is assembled in such a manner that the inertia of the flexible leaf spring aids in the interruption of the electrical circuit from the source to the motor winding and in this manner, it has been found that the governor maintains the motor within one percent of the desired speed setting. The very same governor component parts are used to provide a governor for opposite rotation.

It will be observed that two sets of contact springs and corresponding contact screws are used while a single circuit making and breaking arrangement would suffice. The provision of double contacts increases the life of the governor and furthermore assures operation in the event of failure of one of the contacts. In this manner, reliability of operation of the motor is greatly improved and chances of failure due to governor fault reduced. A high impedance resistor 48, connected across the governor assembly may be used to provide arc suppression for the governor contacts. Similarly, a capacitor quenching circuit or similar means could be used.

In designing the leaf springs, proper care must be taken that the oscillation of the springs is high enough so that a substantially constant motor speed is obtained. If the contact opens and closes relatively slowly the deviation in speed from the desired r.p.m. setting becomes great whereas many oscillations or circuit interruptions, each but for a brief period of time, will maintain the motor within a few r.p.m. of the desired speed. The design and suitable dimensioning of leaf springs has been explained in detail in the copending application for U.S. Letters Patent referenced. The dimensioning of spring contacts for a frequency of several hundred cycles per second furthermore, is well known in the art.

In order to adjust the governor for the desired speed, the following procedure may be employed:

First, a piece of insulation is inserted between one set of contacts in order to remove it from the circuit. The motor then is energized and the adjustable contact adjusted until proper speed is obtained. Next, the motor is stopped, the piece of insulation is inserted between the adjusted pair of contacts and the procedure is repeated for the other set of contacts. In this manner, both sets of contacts are adjusted for the same speed. Suitable means, for instance a small amount of paint or lacquer, may be employed to secure the adjustable, yet rigid, contacts in their position.

The governor construction described herein by virtue of its balanced design is well adapted to operate at a speed of many thousand r.p.m. Bushings 14 and 16 providing contact surfaces for the brushes are disposed as near to the center of rotation as possible so as to exhibit minimum torque losses. Moreover, it will be observed that the instant construction is characterized by a minimum number of individual parts thus providing utmost reliability and stability during operation. Last but not least, if properly assembled for the respective direction of rotation, the governor will maintain the desired speed with accuracy and precision.

While there has been described and illustrated a certain specific design for a governor, it will be apparent to those skilled in the art that various changes and modifications may be made therein without deviating from the principle and intent of the present invention, which shall be limited only by the scope of the appended claims.

What is claimed is:

1. A speed governor for motors of the type described comprising: a disk having a center of rotation; a pair of mounting blocks disposed substantially diametrically opposite one another on said disk and an axis through said mounting blocks being substantially coincident with a diameter through said disk; a pair of substantially identical contact leaf springs, one end of each spring being supported in one of said blocks, and the other end of each leaf spring extending toward the block disposed substantially diametrically opposite; an adjustable contact means disposed in each of said mounting blocks and protruding therefrom to engage the free end of the leaf spring extending thereto, and said leaf springs being positioned in said blocks in such a manner that centrifugal force and the force acting upon each spring caused by acceleration of said disk urge the free end of each spring away from engagement with the respective adjustable contact.

2. A speed governor for motors of the type described comprising: a disk having a center of rotation; a pair of mounting blocks disposed substantially diametrically opposite one another on said disk and an axis through said mounting blocks being substantially coincident with a diameter through said disk; a pair of substantially identically formed contact leaf springs, one end of each spring being supported in one of said blocks, and the other end of each leaf spring extending toward the block disposed substantially diametrically opposite; contact means disposed in each of said mounting blocks and protruding therefrom to engage the free end of the leaf spring extending thereto, and said leaf springs being positioned in said blocks in such a manner that centrifugal force and the force acting upon each spring caused by acceleration of said disk urge the free end of each spring away from engagement with the respective contact means.

3. A speed governor for motors of the type described comprising: a disk having a center of rotation; a pair of mounting blocks disposed substantially diametrically opposite one another on said disk and the major axis through each of said mounting blocks being substantially coincident with a diameter through said disk; a pair of substantially identically formed contact leaf springs, one end of each spring being supported in one of said blocks, and the other end of each leaf spring extending toward the block disposed substantially diametrically opposite; contact means disposed in each of said mounting blocks and protruding therefrom to engage the free end of the leaf spring extending thereto, and said leaf springs being positioned in said blocks in such a manner that centrifugal force and the force acting upon each spring caused by acceleration of said disk urge the free end of each spring away from engagement with the respective contact means.

References Cited in the file of this patent

UNITED STATES PATENTS

| | | |
|---|---|---|
| 2,846,541 | Evans et al. | Aug. 5, 1958 |
| 2,886,666 | Chichester | May 12, 1959 |